(12) United States Patent
Schmidt

(10) Patent No.: US 7,206,819 B2
(45) Date of Patent: Apr. 17, 2007

(54) METHOD AND APPARATUS FOR PROVIDING VIRTUAL NAMESPACES FOR ACTIVE COMPUTING ENVIRONMENTS

(75) Inventor: Brian Keith Schmidt, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 640 days.

(21) Appl. No.: 09/765,879

(22) Filed: Jan. 18, 2001

(65) Prior Publication Data

US 2002/0095479 A1    Jul. 18, 2002

(51) Int. Cl.
*G06F 15/167* (2006.01)
*G06F 15/173* (2006.01)

(52) U.S. Cl. .................. 709/214; 709/213; 709/216; 709/226

(58) Field of Classification Search ........ 709/223–225, 709/245, 202, 203, 213, 226; 370/389
See application file for complete search history.

(56) References Cited

U.S. PATENT DOCUMENTS

| | | | |
|---|---|---|---|
| 6,223,289 B1 | 4/2001 | Wall et al. | 713/201 |
| 6,324,177 B1 * | 11/2001 | Howes et al. | 370/389 |
| 6,389,419 B1 * | 5/2002 | Wong et al. | 707/7 |
| 6,484,174 B1 | 11/2002 | Wall et al. | 707/9 |
| 6,496,871 B1 * | 12/2002 | Jagannathan et al. | 709/202 |
| 6,557,024 B1 * | 4/2003 | Saito et al. | 709/226 |
| 6,629,127 B1 * | 9/2003 | Deen et al. | 709/203 |
| 6,651,096 B1 * | 11/2003 | Gai et al. | 709/223 |
| 6,848,106 B1 * | 1/2005 | Hipp | 709/213 |

OTHER PUBLICATIONS

Egevang et al.; RFC 1631: The IP Network Address Translator (NAT); May 1994.*
Rekhter et al.; RFC 1597: Address Allocation for Private Internets; Mar. 1994.*
VMware, Technical White Paper—Feb. 1999, pp. 1-7.*

* cited by examiner

*Primary Examiner*—Rupal Dharia
*Assistant Examiner*—Quang N. Nguyen
(74) *Attorney, Agent, or Firm*—Martine Penilla & Gencarella, LLP

(57) ABSTRACT

The present invention provides private namespaces for active computing environments. The invention uses one or more "compute capsules". A compute capsule is a private, portable, persistent environment. Each compute capsule comprises an arbitrary set of active processes and their associated state information. In one embodiment, compute capsules provide a private, customizable view of a shared file system, so that users can modify arbitrary files without the expense of providing each person with a separate and complete file system image. In one embodiment, the invention provides environments with different personalities, each of which can be contained within a capsule. For example, a user can have one capsule for normal desktop usage, a fail-safe capsule with a minimal environment and no external dependencies, capsules for work-related and personal activities, etc. In one embodiment, capsules are given access rights.

18 Claims, 15 Drawing Sheets

METHOD AND APPARATUS FOR PROVIDING VIRTUAL NAMESPACES FOR ACTIVE COMPUTING ENVIRONMENTS

BACKGROUND OF THE INVENTION

1. Field of the Invention

The present invention relates to virtual namespaces for active computing environments.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background Art

In modern computing it is desirable for a user to be interacting with a computer, to stop the interaction with the computer, to move to a new computer, and to begin interacting with the new computer at precisely the point where the user stopped interacting with the first computer. Using current schemes, however, this is not possible because the user's computing environment cannot be represented in a form that can be understood by both computers and moved between the computers.

However, in co-pending U.S. patent application entitled "Method and Apparatus for Representing and Encapsulating Active Computing Environments" Application No. 09/764,774 filed on Jan. 16, 2001, assigned to the assignee of the present application, and hereby fully incorporated into the present application by reference, it was described how a group of active processes and their associated state could be represented in a form that made it possible to halt the active processes, to move them to a different binary compatible machine, or to suspend them on a disk for later revival on the same or a different machine.

In such an environment, many users may be accessing data or computer programs on a single remote computer. It would be desirable if the users could arrange and organize the appearance of the data and computer programs in a way that is suitable for them. Furthermore, it would be desirable if the user's system interface was virtualized in a manner that allowed for portability. Current schemes, however, do not allow for such customization or virtualization. Before further discussing the drawbacks of current schemes, it is instructive to discuss how the nature of computing is changing.

The Nature of Computing

The nature of computing is changing. Until recently, modem computing was mostly "machine-centric", where a user accessed a dedicated computer at a single location. The dedicated computer had all the data and computer programs necessary for the user to operate the computer, and ideally, it had large amounts of hardware, such as disk drives, memory, processors, and the like. With the advent of computer networks, however, different computers have become more desirable and the focus of computing has become "service-oriented". In particular, computer networks allow a user to access data and computer programs that exist elsewhere in the network When the user accesses such data or computer programs, the remote computer is said to be providing a service to the user. With the improvement in services available to users, the need to have a dedicated computer following the machine-centric paradigm is greatly reduced. The machine-centric paradigm also becomes much less practical in this environment because distributing services is much more cost-effective.

In particular, computers in a service-oriented environment have little need for powerful hardware. For instance, the remote computer processes the instructions before providing the service, so a powerful processor is not needed on the local access hardware. Similarly, since the service is providing the data, there is little need to have large capacity disk drives on the local access hardware. In such an environment, one advantage is that computer systems have been implemented that allow a user to access any computer in the system and still use the computer in the same manner (i.e., have access to the same data and computer programs).

For instance, a user may be in location A and running a word processor, a web browser, and an interactive multimedia simulation. In a service-oriented environment, the user might stop using the computer in location A and move to location B where the user could resume these computer programs on a different machine at the exact point where the user stopped using the machine at location A, as long as both computers had access via the computer network to the servers where the programs were being executed. The programs in this example, however, cannot be moved between computers when they are active because of the design of current operating systems.

Resource Naming

On a typical machine object names are host-dependent and not the resource interface between the kernel and user is not cleanly separated. Tokens used by the kernel to identify resources encapsulate the binding to the underlying physical resource as well, and resource tokens are only valid for a specific machine. This creates unnecessary dependencies that irreversibly couple processes to particular instances of an operating system on particular machines One scheme, for instance, uses a Unix process identifier (PID), which is a token by which one process may refer to another process. The PID, however, is actually an index into an active process table inside the kernel, (i.e., it is the physical resource itself). A PID is only valid on a particular machine and is not globally unique. A process cannot move to another machine and maintain the same PID. Thus, a scheme using a PID limits the ability for a group of active processes to move between machines and still be able to access the resources they need to continue to run.

Customization

It is desirable to retain some of the benefits of machine-centric computing. In particular, machine-centric computing allows a user to customize their computing environment, for instance by arranging and naming their file system. This is trivial in a machine-centric environment because typically only one user controls the machine. In a service-oriented environment, however, remote computers are often accessed by many users, and the same files are shared between all of these users. In such environments, users have little opportunity to customize their environment.

Privacy, Isolation, and Security

Other benefits from machine-centric computing that are desirable to retain are privacy, isolation, and security. In particular, machine centric computing gives the user a dedicated machine that is completely secure and private, and totally isolated from everyone else. In a shared environment, however, such security, privacy, and isolation is difficult to achieve.

In a service-oriented environment remote computers are often accessed by many users, and the same resources are shared between all of these users. In such environments, users can view and sometimes manipulate the resources in use by others. These issues are all related to the naming of resource objects in the system (e.g., files, processors, memory, and attached devices). One scheme, for instance, shares the names of objects across many users. This limits isolation and privacy because every user can name and access all objects in the system, including those controlled by others. This further limits security because every user has access to the same objects and may perform unwanted modifications on them.

SUMMARY OF THE INVENTION

The present invention provides virtual namespaces for active computing environments. According to one or more embodiments of the present invention a "compute capsule" is implemented. Each compute capsule serves to represent and encapsulate an active computing environment. An active computing environment comprises one or more active processes and the complete state necessary to allow the encapsulation to be suspended and revived on any binary compatible machine.

Using the compute capsule, one embodiment of the present invention provides a private, customizable view of a shared file system, so that users can modify arbitrary files without the expense of providing each person with a separate and complete file system image. The underlying file system is mapped into the compute capsule in a portion of the capsule called a "virtual namespace". The owner of the capsule (or other entity with access rights) is permitted to alter the files in the virtual namespace in a manner similar to the way a user might alter the file system on a dedicated computer in a machine-centric environment.

The virtual namespace is host-independent, meaning that resources (e.g., files, processors, memory, and attached devices) have location-transparent names. This enables the capsule to migrate between binary compatible machines and provides privacy and isolation between multiple capsules.

In another embodiment, the files mapped into the capsule may be read-only files. In this case, the owner of the capsule is permitted to modify the file within their virtual namespace only, while the underlying file remains unchanged. This is termed "copy-on-write mode".

In one embodiment, the invention provides environments with different personalities, each of which can be contained within a capsule. For example, a user can have one capsule for normal desktop usage, a fail-safe capsule with a minimal environment and no external dependencies, and capsules for work-related and personal activities. This is achieved by controlling the contents of the namespace. For instance, a capsule might be created for an untrusted guest user by populating the namespace with reference to a limited set of resources. In one embodiment, capsules are given access rights.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

Figure 1:
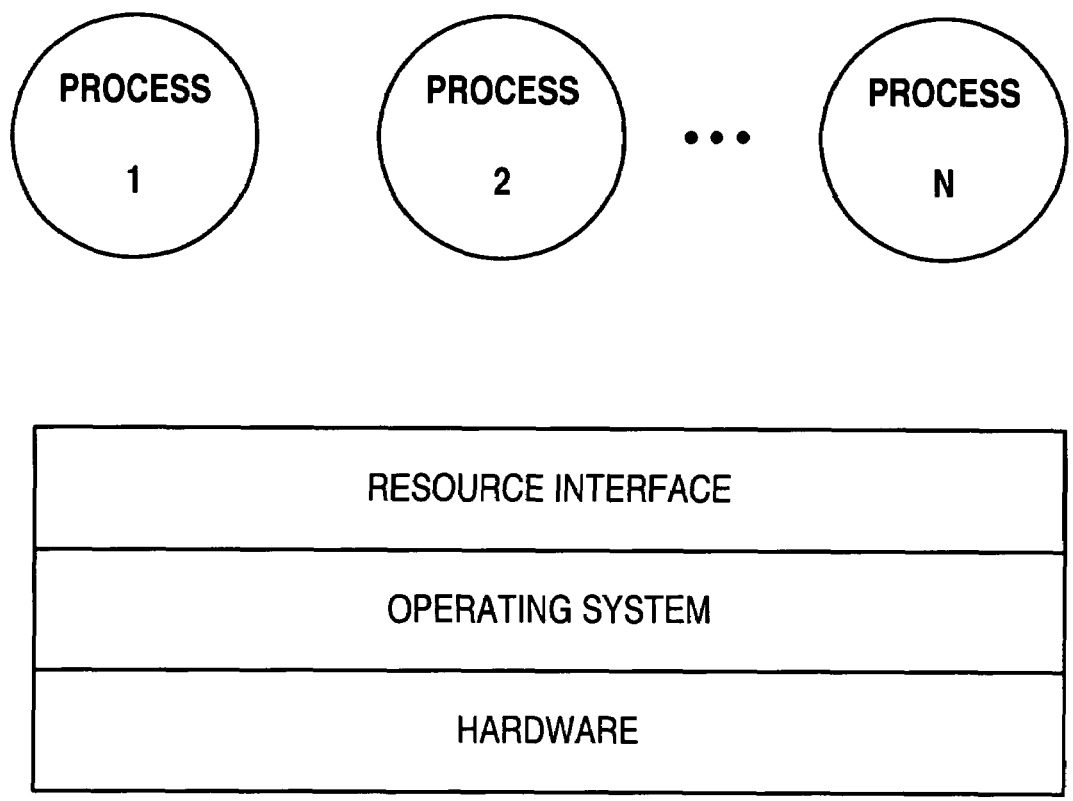
FIG. 1 provides an overview of a multi-tier computer architecture.

The invention is personal namespaces for active computing environments. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Compute Capsules

A compute capsule comprises one or more processes and their associated system environment. A compute capsule is configured to provide an encapsulated form that is capable of being moved between computers or stored off-line, for instance on a disk drive or other non-volatile storage medium. The system environment in a capsule comprises state information relating to exactly what the processes are doing at any given time in a form that is understandable by any binary compatible machine. System environment information may include, for instance, privileges, configuration settings, working directories and files, assigned resources, open devices, installed software, and internal program state.

In one embodiment, the operating system is re-partitioned so that some of the internal program's state is moved into the capsule. This includes moving one or more elements of the CPU state, the file system state, the device state, the virtual memory state, and the inter-process communication (IPC) state into the capsule.

Processes in the same capsule may communicate with each other and share data, for instance using pipes, shared memory, or signals. Communication with processes outside the capsule, on the other hand, is restricted to Internet sockets and globally shared files. This ensures that capsules can move without restriction. For example, a pipe between processes in different capsules would force both capsules to reside on the same machine, but a socket can be redirected. The use of compute capsules is completely transparent, and applications need not take any special measures, such as source code modification, re-compilation, or linking with special libraries. In addition, a system using compute capsules can seamlessly inter-operate with systems that do not.

Virtual Namespace

Capsules offer privacy, isolation, and security within a shared environment by providing a virtual namespace within each capsule. Current systems allow users to access all processes and other system resources. For instance, anyone can gather (and sometimes manipulate) information about the activities of others. Compute capsules address this issue by providing a virtual namespace for its member processes where all name references are local to a capsule (i.e., they are valid only within the capsule), and capsule contents are not externally visible or accessible (unless they are explicitly exported). Thus, capsules provide privacy and isolation because they are completely disjoint, (i.e., it is impossible for an object in one capsule to name an object in another capsule).

Figure 2:
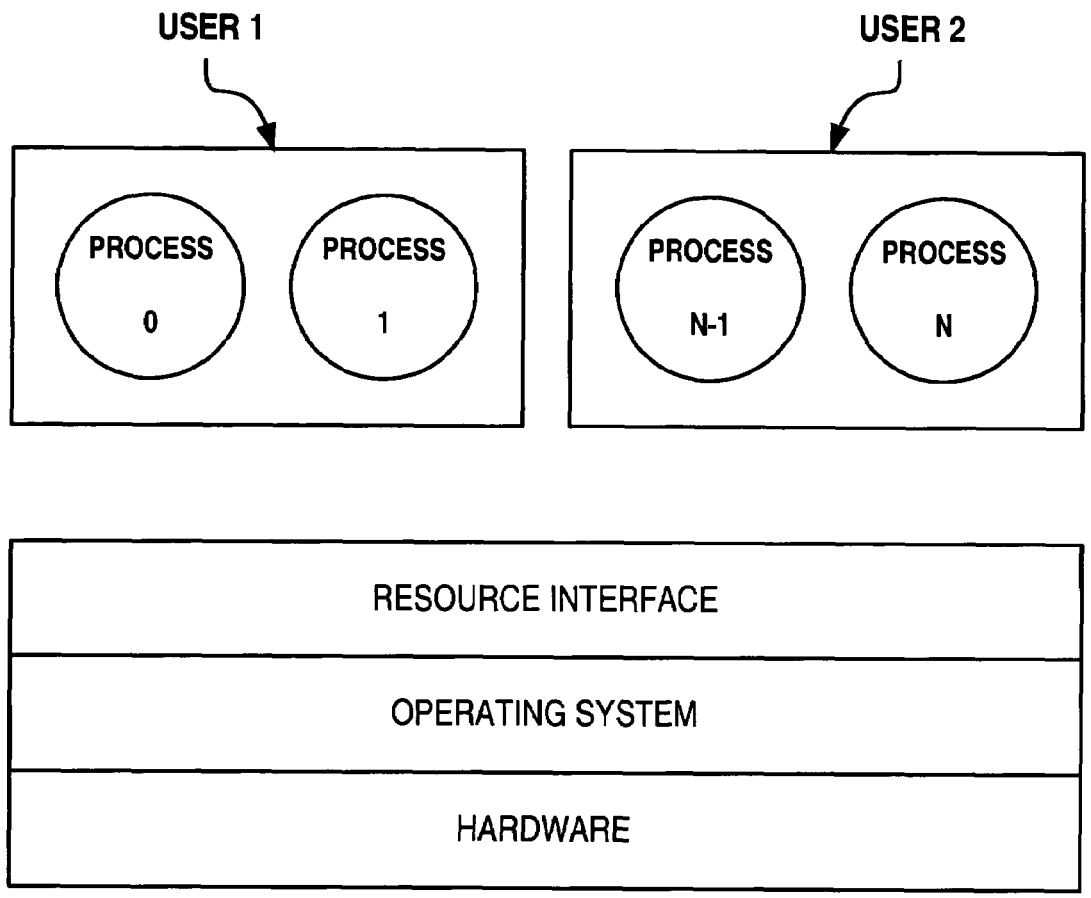
FIG. 2 shows a typical arrangement of a resource interface in a machine-centric environment.

To provide a virtualized namespace the interface with which a process accesses resources must be changed. FIGS. 1 and 2 show examples of how resource interfaces are typically arranged. FIG. 1 shows a dedicated system in a common machine-centric environment. There, multiple processes labeled process 1 through process N are owned by a single user. Their interaction with the system will be through a resource interface coupled to the operating system, which is in turn coupled to the machine hardware. In this example the resource interface is irreversibly coupled to the operating system and the hardware, which makes it impossible for processes 1 through N to ever migrate from the machine.

FIG. 2 shows a shared system. There, multiple processes labeled process 0, process 1, process N–1, and process N. Processes 0 and 1 are owned by a first user. Processes N–1 and N are owned by a second user. The first and second users' interactions with the system will be through a resource interface coupled to the operating system, which is in turn coupled to the machine hardware. In this example, as with the example of FIG. 1, the resource interface is irreversibly coupled to the operating system and the hardware, which makes it impossible for processes 1 through N to ever migrate from the machine.

Figure 3:
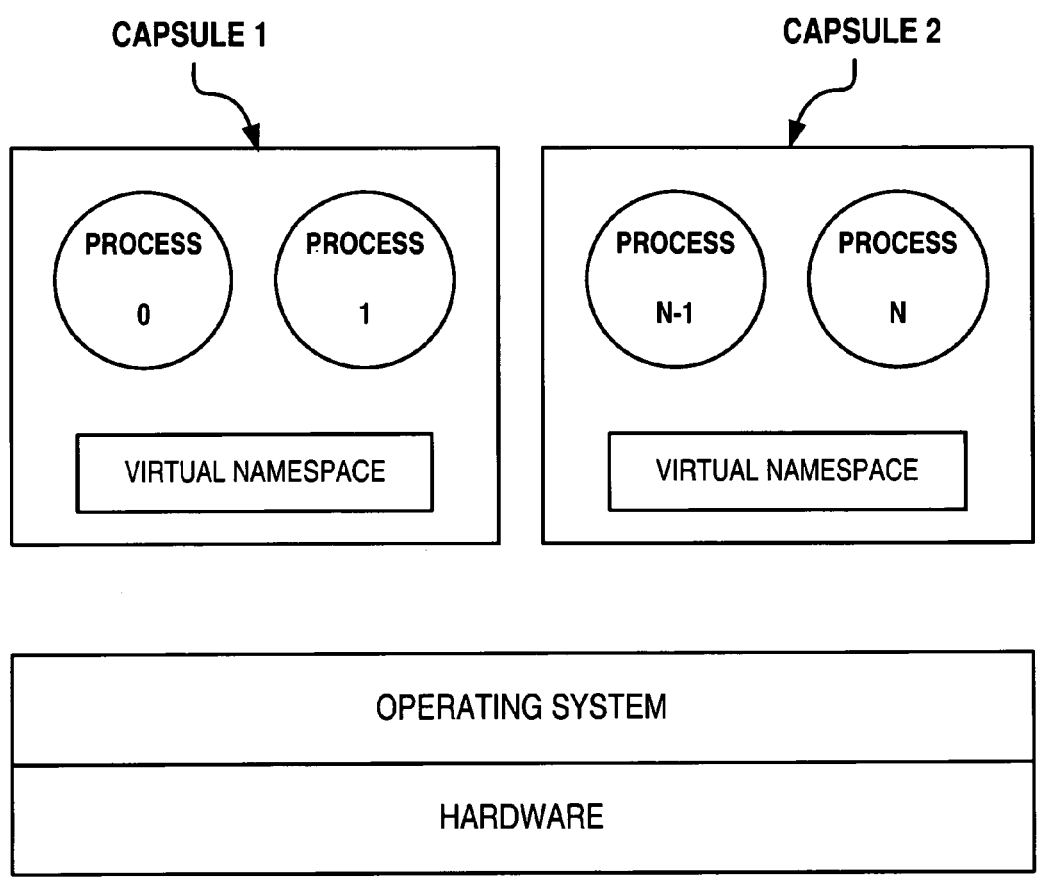
FIG. 3 shows a typical arrangement of a resource interface in a shared environment.

FIG. 3 shows the virtualized namespace according to an embodiment of the present invention. There, capsules 1 and 2 each have two processes active within them, labeled processes 0, 1, N–1, and N respectively. Additionally, capsules 1 and 2 have a virtual namespace within them. The virtual namespaces of each capsule are able to communicate with the operating system and then to the computer hardware coupled to the operating system. The capsules, however, are not bound to the naming system used by the specific instance of the operating system shown in the example. Instead, they may communicate with hardware in a host-independent manner through the virtual namespace and could do so as well if migrated to a different instance of an operating system on a different machine.

File System View

One component of the virtual namespace is the file system view. The file system view gives each capsule a personal view of the underlying file system and provides capsule owners with the ability to customize their capsule environments within a shared system. To create the file system view for a compute capsule, each user is assigned globally accessible capsule storage to contain the view. Whereas a compute capsule resides entirely within a single machine at any given time, the underlying file system is globally available. This provides a simple mechanism for sharing data between capsules, as well as for maintaining a coherent view of the operating environment as the capsule moves. For example, a user may own multiple capsules that access a shared database, or software packages can be made globally available for use by all capsules.

Capsules map portions of the file system into their namespace, thereby leveraging the underlying system for most file administration tasks (e.g., backups, maintaining software packages, installing disks, configuring file servers, etc.). The file system view is private to a capsule and fully modifiable by its owner, and it provides a copy-on-write mode of file access to support the modification of read-only or system files. In addition, capsules may export portions of their view to other capsules in order to support data sharing.

Figure 4:
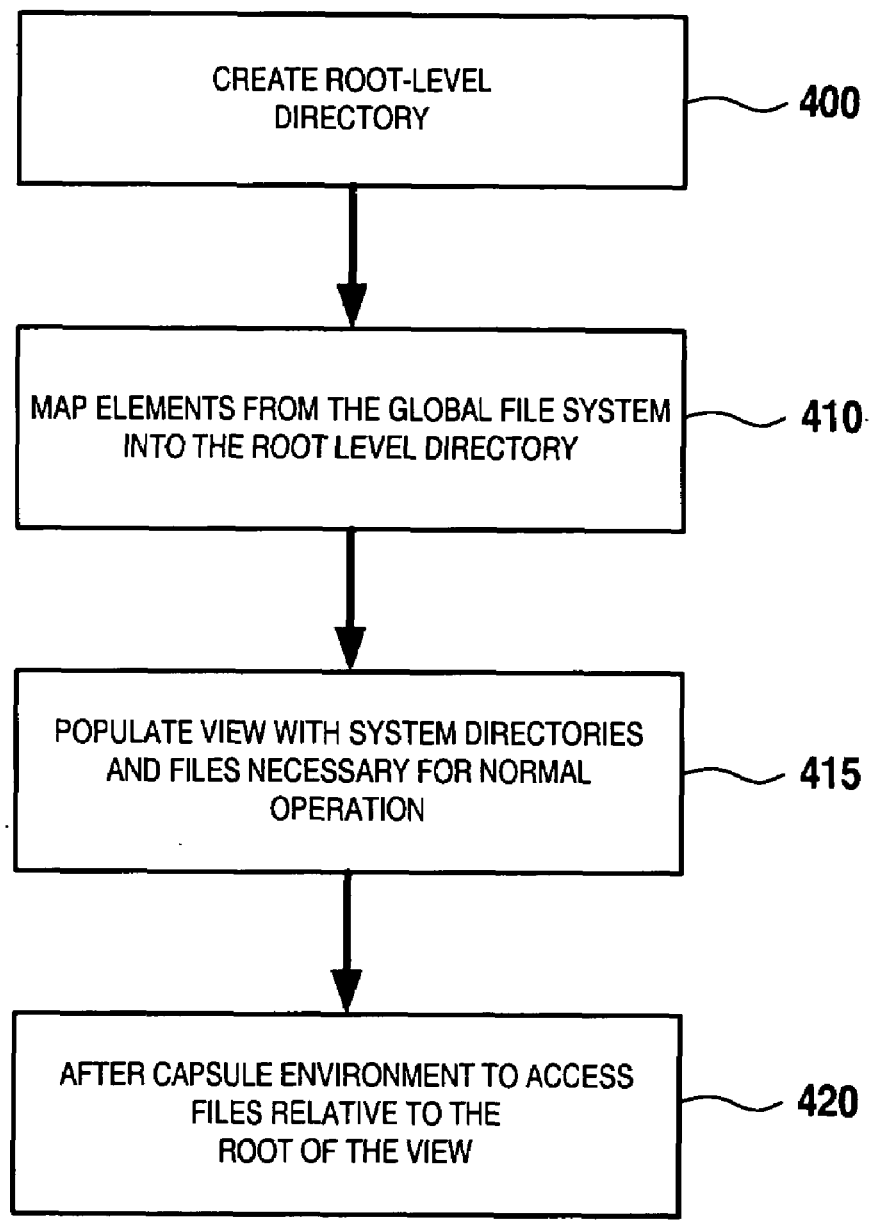
FIG. 4 shows the creation of a file system view according to an embodiment of the present invention.

In one embodiment, when a capsule is created, a new file system view is synthesized as shown in FIG. 4. At step 400 a root-level directory is created. Then, at step 410, elements from the global file system are mapped into the root-level directory. Next, the view is populated with system directories and files necessary for normal operation at step 415. Thereafter, the system alters the environment of the compute capsule so that it will access files relative to the root of this view at step 420. This enhances both security and privacy, as capsules are restricted to accessing only files within their private views. Protection of files mapped into different views is provided by the underlying file system.

In one embodiment, by default, file system views are automatically populated with system directories and files necessary for normal user operation. Such files include, for instance: application binaries, libraries, certain device drivers, user home directory and data files, etc. The contents of the view are fully configurable by the owner of the capsule, which means that system-level files can be modified. Because these files are shared by other capsules, they are mapped into a file system view in a copy-on write mode. When a capsule modifies such a system file, a private copy is added to the capsule, and the altered file follows the capsule so that the changes persist. In this way, changes only affect the capsule that made the modifications. Files and directories normally assumed to reside in local storage (e.g., the Unix swap directory where temporary files are often created) must move with the capsule. Conversely, there are many standard, machine-local directories that are the same across systems (e.g.,/bin contain application programs on Unix systems), which may be mapped into the file system view directly for the local machine for improved performance.

Figure 5:
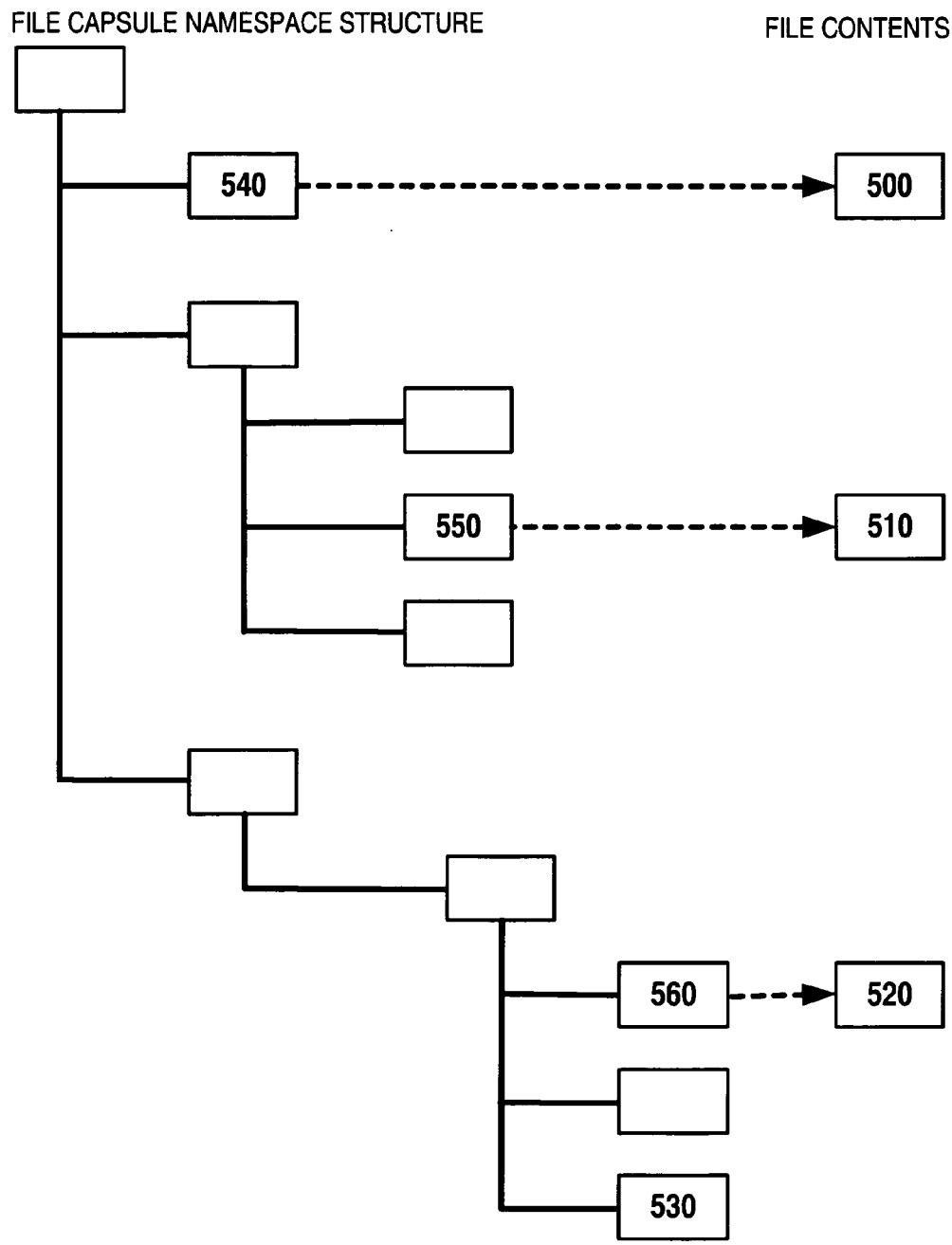
FIG. 5 is a diagram showing the file system view and how it is mapped from the underlying file system into the capsule according to an embodiment of the present invention.

FIG. 5 is a diagram showing the file system view and how it is mapped from the underlying file system into the capsule. The file system namespace structure is internal to the capsule and fully modifiable by its owner. The names of the files in the file system namespace structure, 530 for instance, maybe changed by the capsule owner. File 530 references the contents of a file in the underlying global file system. File 500 is an example of a file stored locally that is mapped into the capsule namespace 540.

File 510 is an example of a system file that is copied into the capsule namespace 550 because it was modified by the capsule owner. File 520 is a read-only file that is copied into the capsule namespace 560 for update. File 520 is read-only because it is owned by the administrator in the underlying file system, who did not allow normal users to modify it. In the capsule the owner plays the administrator role, so file 520 is copied into the capsule where it is owned by the capsule owner. This is termed copy-on-write mode which means that when the capsule owner wants to write to file 560, it is copied into the capsule from file 520.

Elements from the underlying file system are mapped into the view based on the contents of two configuration files, in one embodiment. The first file provides site-wide defaults, which enables all capsules to access standard software and data in the system. The second file is located within a user's capsule storage and contains custom mappings. In one embodiment, the default set of file system view mappings includes standard system directories, such as /bin for applications, /lib for system libraries, /usr/man for manual pages, etc. These system files are typically cached on local disks, and it is assumed their contents are uniform across machines in the system. Given that such files are rarely changed and that system administrators maintain consistency among the machines in the system, this is a valid assumption. In one embodiment, a special directory called /capsule is mapped into all capsules, and it contains global capsule information, such as the capsule name database.

To create the file system view from the configuration files, mount points are established for each of the required directories, and then the loopback file system is used to map them into the view from the local machine. Although capsule owners are free to modify their file system views, it is not desirable for them to modify the underlying local system-level files (for which they may not have permission). Thus, mounts of directories such as /lib are made read-only. If users wish to modify a directory such as /lib, they make a copy in their view and remove the map to the underlying file system. Then, changes only affect the copy, which will remain in the user's private capsule storage. For directories like /tmp, the system creates a unique subdirectory inside and then uses the loopback file system to map the subdirectory into the view with the original directory name. The contents of such directories are cached on the local machine but maintained in capsule storage. In one embodiment, once mounts have been established, a chroot system call re-assigns the root of the file system to be the root of the file system view, which gives capsules the illusion of a private file system.

Figure 9:
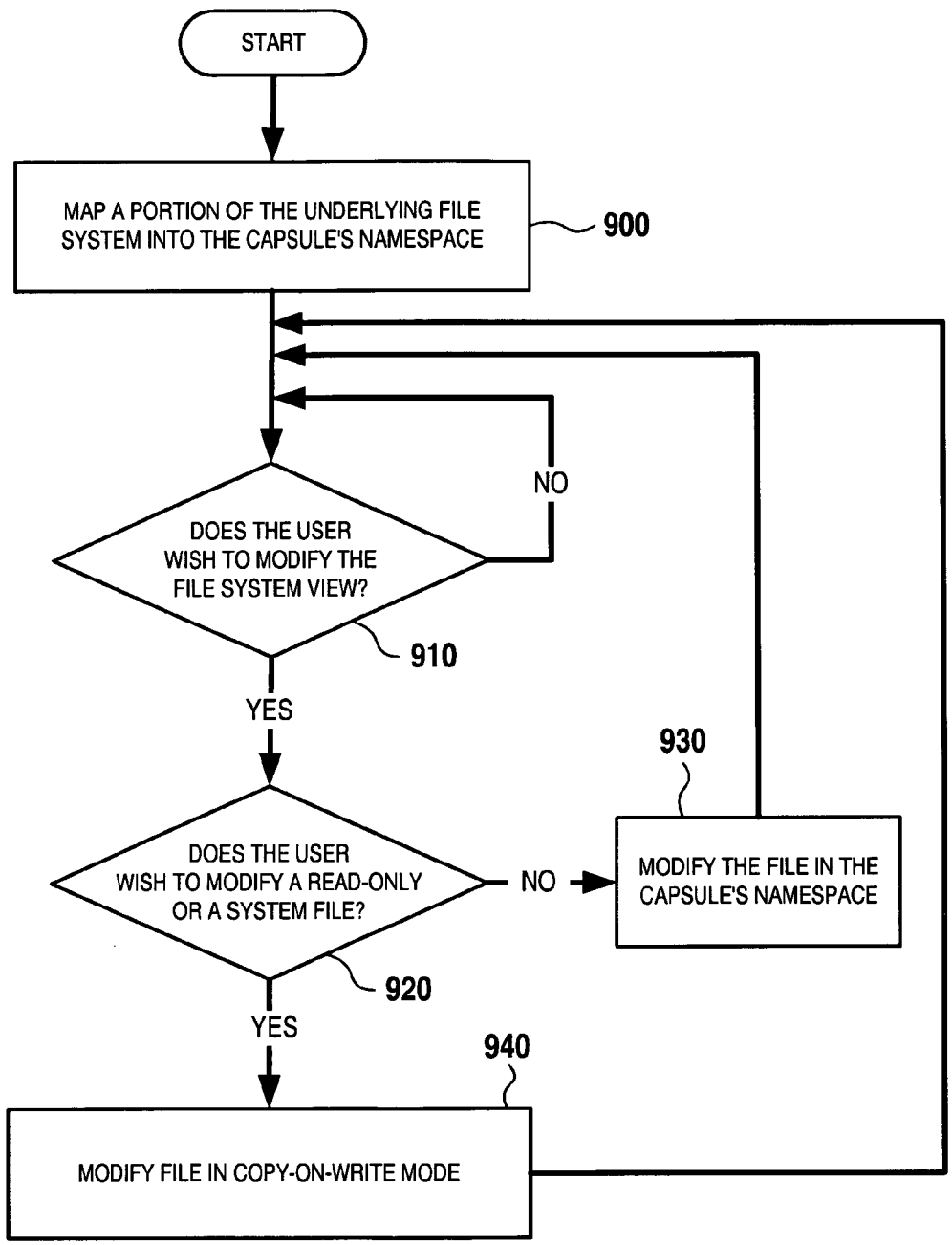
FIG. 9 is a flowchart showing the manner in which one embodiment of the present invention maintains a personal view of the underlying operating system.

The manner in which one embodiment of the present invention implements the personal view of the underlying operating system is shown in FIG. 9. At step 900, a portion of the underlying file system is mapped into the capsule's virtual namespace. Then, at step 910, it is determined whether the owner or user of the capsule wishes to modify the file system view. If not, the algorithm continues to wait until the user does wish to modify the file system view. If so, it is next determined at step 920 whether the user wishes to modify a read-only or a system file. If the file is not read-only or a system file, the file in the capsule's namespace is modified at step 930 and the process repeats at step 910. If the file is read-only or a system file, the file is modified in a copy-on-write mode at step 940 and the process repeats at step 910.

Resource Naming

Capsules provide host-independence and isolation via a name translation mechanism within the virtual namespace that allows capsules to name resources. Each resource a compute capsule can name is assigned a virtual token that is only valid within the capsule. The tokens are unique to each capsule and valid across all machines in the system. They are transparently and dynamically bound to different physical resources on any host in the system. In this way, capsules separate the naming of resources from their physical embodiment. When a process passes a reference to a resource object to the kernel, the virtual name is mapped to the physical resource in the local system. This procedure is reversed for return values from the kernel.

Resource objects include processes, process identifiers, shared memory segments, open devices, message queue keys, semaphore keys, and Internet addresses, for instance. A name translation table binds user-visible tokens to the physical resources on the underlying machine. A name translator is interposed between user processes operating in the capsule virtual namespace and the rest of the system, which operates on the physical namespace of the machine. Translation is transparent to the operating system and applications, (i.e., they require no modifications).

Consider the example of process identifiers (PIDs). Each process in a compute capsule is assigned a virtual PID, which is mapped to the system-level PID on the underlying machine. Processes can name other processes only by their virtual PIDs. If the capsule moves to a new host, its member processes may be assigned new system-level PIDs, but the virtual PIDs will remain the only valid process names within the capsule.

Figure 6:
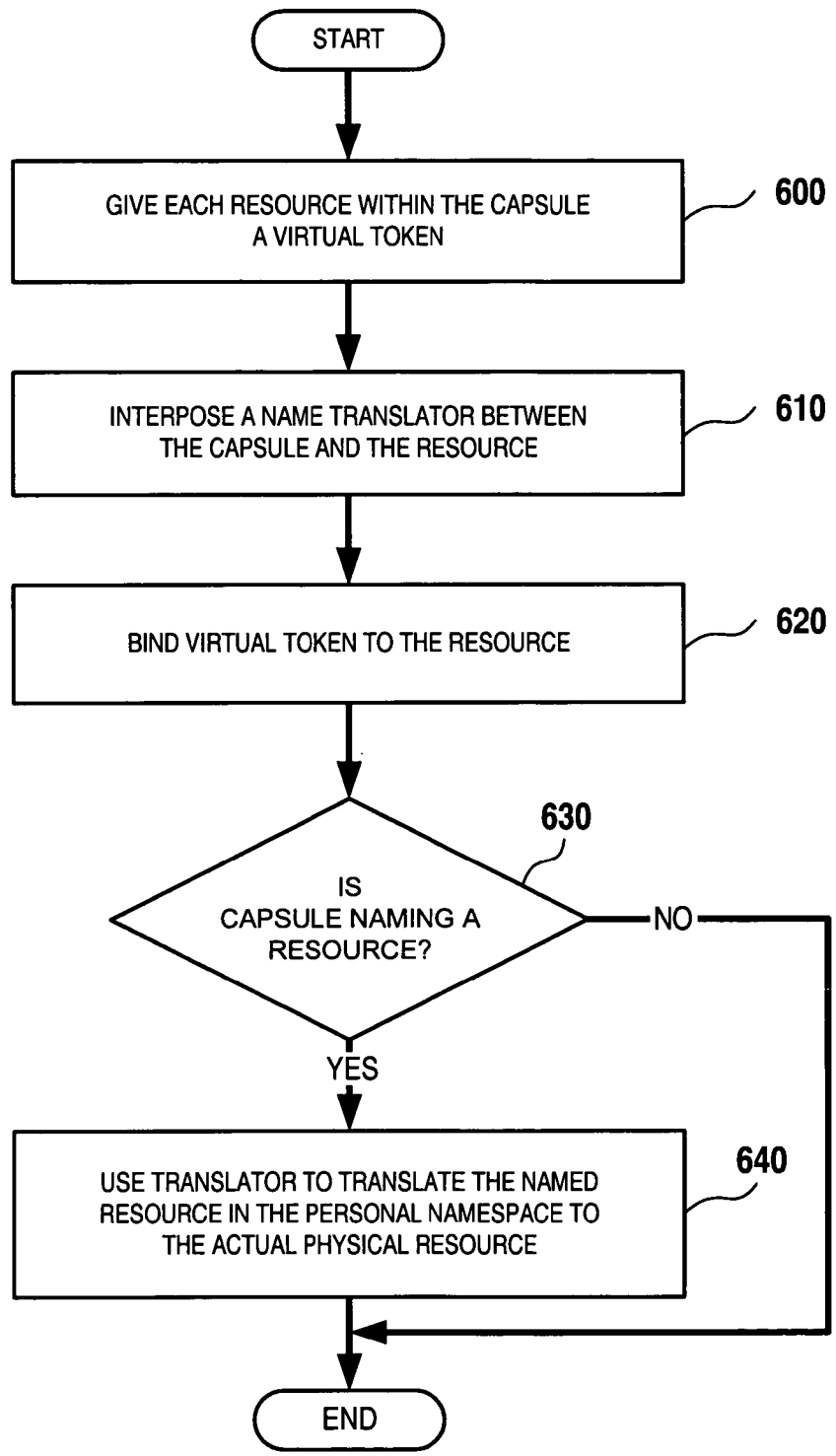
FIG. 6 shows how an embodiment of the present invention names resources.

The process of assigning virtual namespaces according to an embodiment of the present invention is shown in the flowchart of FIG. 6. At step 600 each resource is given a virtual token within the capsule. Next, at step 610, a name translator is interposed between the compute capsule and the underlying physical resources. Then, at step 620, the virtual token is bound to the actual physical resource. Next, at step 630, it is determined whether the capsule is naming a resource in its personal namespace. If so, the name translator is used at step 640 to translate the named resource in the personal namespace to the actual physical resource.

Figure 7:
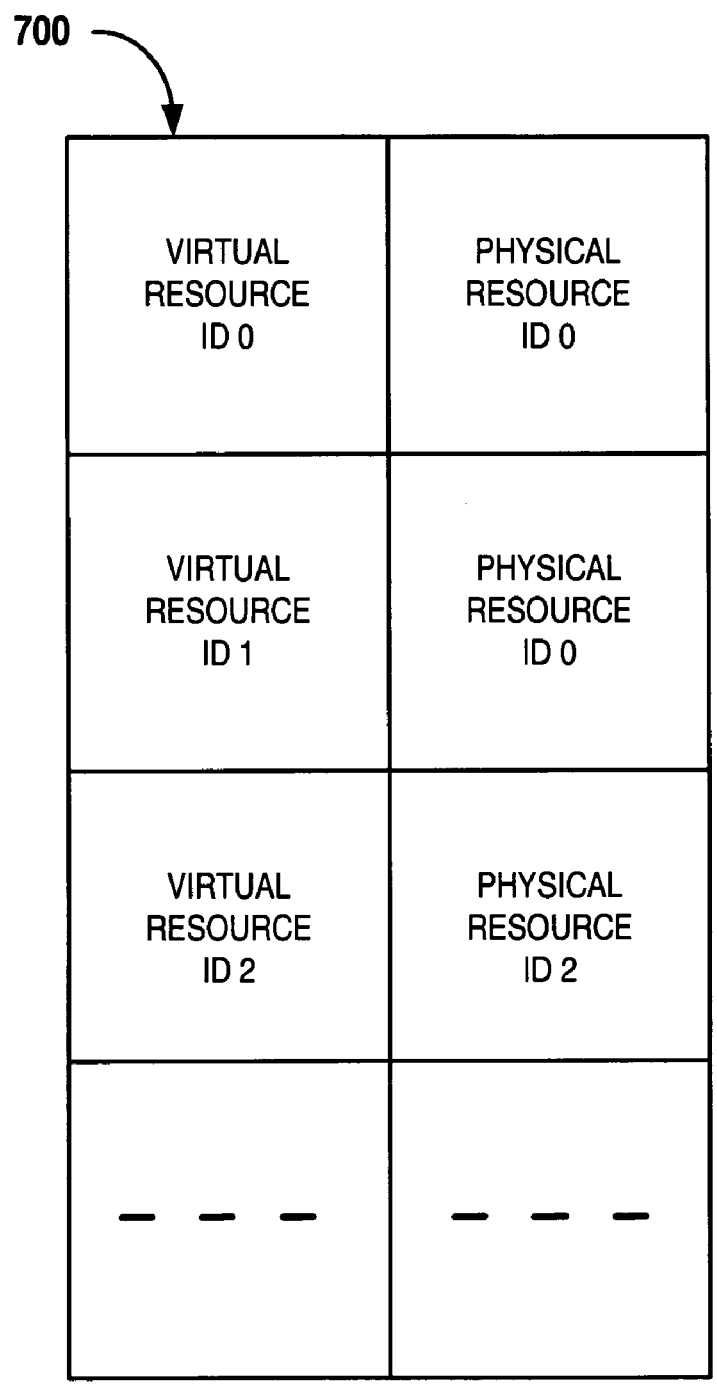
FIG. 7 is a name translation table according to an embodiment of the present invention.

Capsule relocation is provided by suspending the capsule and resuming it elsewhere. The name translation tables are persistent within a capsule and are mapped to new machine-local values if the capsule is moved to another host, thereby providing transparent mobility of the computing environment. FIG. 7 shows one embodiment of a name translation table. The name translation table 700 is a table having a mapping from a virtual resource ID which resides in the virtual namespace of the capsule and the physical resource ID which is bound to a particular resource device on a specific machine.

One embodiment of the present invention adds two name translation tables to the kernel. One table maps virtual names to physical resources, and the other performs the reverse mapping. In one embodiment, they are implemented as hash tables that are segmented based on capsule identity, (i.e., a logical table for each capsule). A hash table lookup is performed at all points within the system where interface objects are named, including system entry points (e.g., system calls), special files (e.g., the /proc process file system), and ioctl calls. As new system objects are created, they are assigned capsule-local names and entered into the hash tables for future lookups. Similarly, when a resource is no longer available, its virtual name and hash table slot are freed for later re-use. References to objects that are not in the tables return an error. For example, the ps command and listing the contents of /proc only return PIDs for capsule members.

Figure 10:
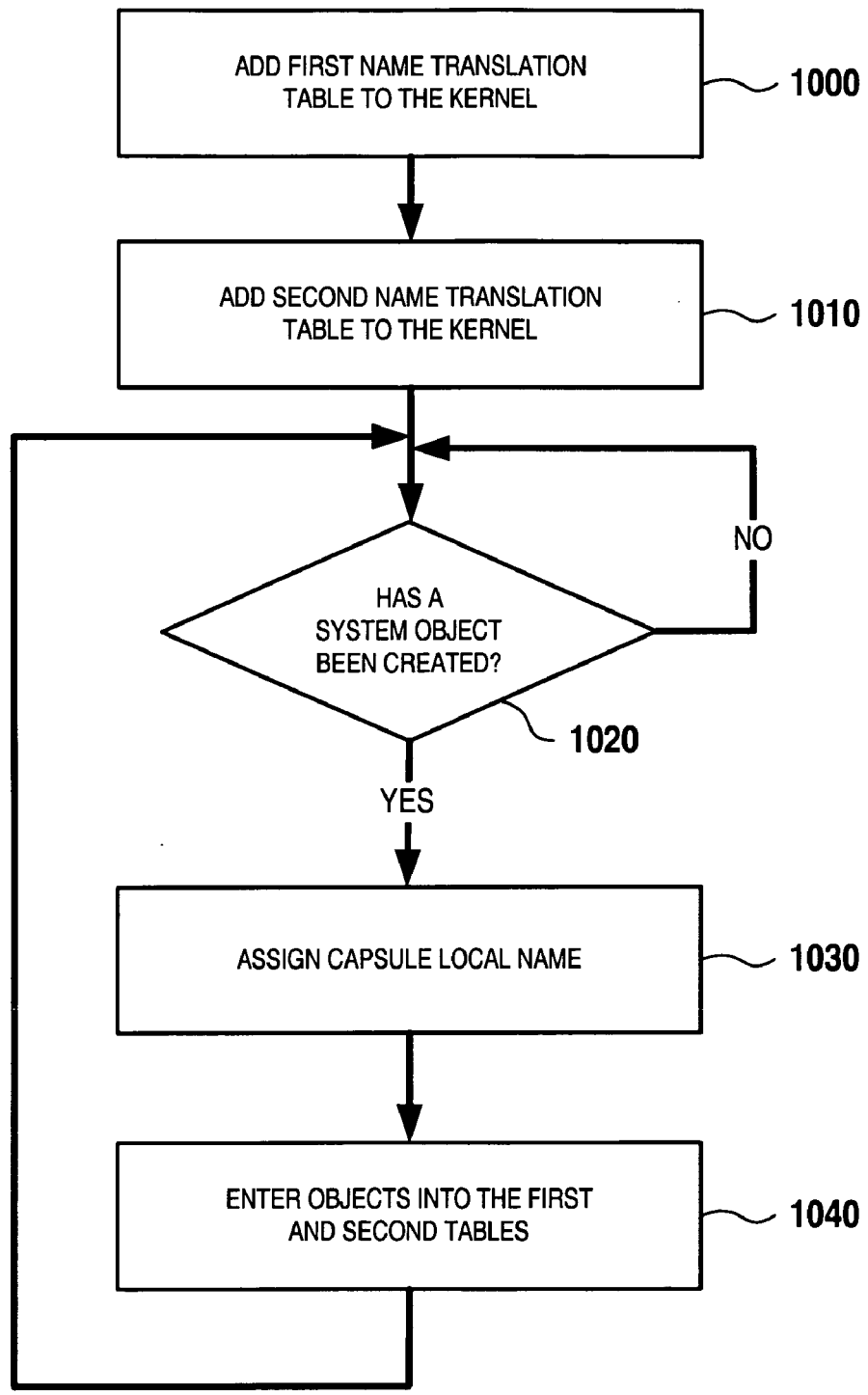
FIG. 10 shows how an embodiment of the present invention names resources.

FIG. 10 shows resource naming according to one embodiment of the present invention. At step 1000 a first name translation table is added to the kernel to map virtual names to physical resources. At step 1010 a second name translation table is added to the kernel to map physical resources to virtual names. Then, at step 1020, it is determined whether a system object has been created. If one has not, the system waits until one is created. If a system object has been created, a capsule-local name is assigned at step 1030 and at step 1040 the objects are entered into the first and second tables for future lookup. Thereafter, the process repeats at step 1020.

Figure 11:
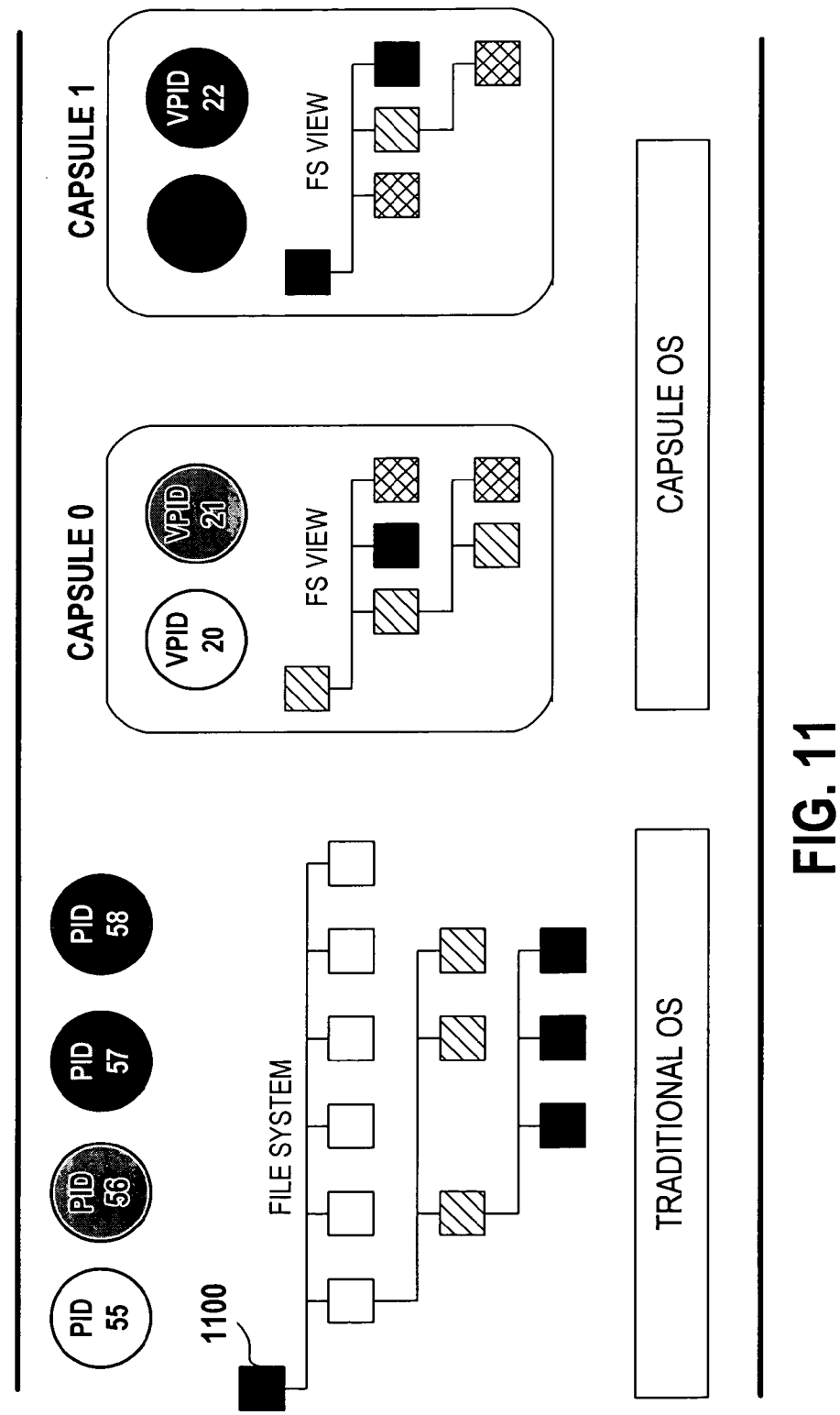
FIG. 11 shows the namespace of a traditional operating system compared to a compute capsule.

Thus, for each capsule within the system, there is a private namespace, which is comprised of two components: the file system view and the virtualization of resource names. FIG. 11 shows part of the namespace of a traditional operating system compared to a compute capsule. The traditional operating system has four processes, PIDs 55, 56, 57, and 58, and a file system hierarchy that may include remote mounts. From the perspective of the capsule system, there are two capsules, (capsules 0 and 1), each containing two processes and separate views of the file system.

Consider process 55, which has been assigned VPID 20 in capsule 0. If this process were to execute the ps command on a UNIX-based operating system or execute "ls/proc", the result would be to return the values 20 and 21. If it were to execute the shell command "kill 56" or "kill 22", it would receive an error since 56 is the PID for the process with VPID 21, and there is no process in capsule 0 with VPID 22. Similarly, if it tried to issue a "cd" command to directory 1100, it would receive an error.

Embodiment of Computer Execution Environment (Hardware)

Figure 12:
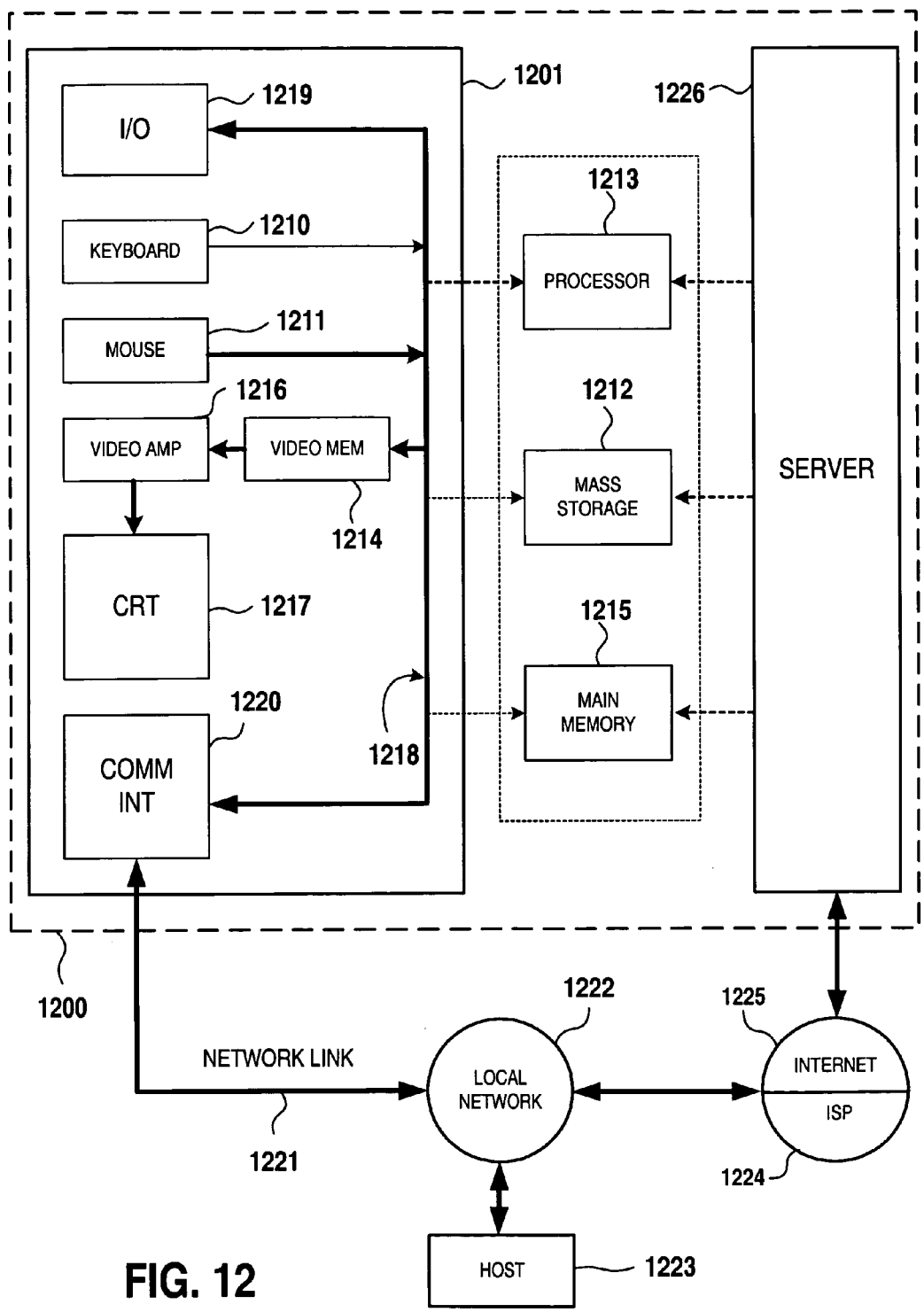
FIG. 12 is an embodiment of a computer execution environment in which one or more embodiments of the present invention can be implemented.

An embodiment of the invention can be implemented as computer software in the form of computer readable program code executed in a general purpose computing environment such as environment 1200 illustrated in FIG. 12, or in the form of bytecode class files executable within a Java™ run time environment running in such an environment, or in the form of bytecodes running on a processor (or devices enabled to process bytecodes) existing in a distributed environment (e.g., one or more processors on a network). A keyboard 1210 and mouse 1211 are coupled to a system bus 1218. The keyboard and mouse are for introducing user input to the computer system and communicating that user input to central processing unit (CPU 1213. Other suitable input devices maybe used in addition to, or in place of, the mouse 1211 and keyboard 1210. I/O (input/output) unit 1219 coupled to bi-directional system bus 1218 represents such I/O elements as a printer, A/V (audio/video) I/O, etc.

Computer 1201 may include a communication interface 1220 coupled to bus 1218. Communication interface 1220 provides a two-way data communication coupling via a network link 1221 to a local network 1222. For example, if communication interface 1220 is an integrated services digital network (ISDN) card or a modem, communication interface 1220 provides a data communication connection to the corresponding type of telephone line, which comprises part of network link 1221. If communication interface 1220 is a local area network (LAN) card, communication interface 1220 provides a data communication connection via network link 1221 to a compatible LAN. Wireless links are also possible. In any such implementation, communication interface 1220 sends and receives electrical, electromagnetic or optical signals which carry digital data streams representing various types of information.

Network link 1221 typically provides data communication through one or more networks to other data devices. For example, network link 1221 may provide a connection through local network 1222 to local server computer 1223 or to data equipment operated by ISP 1224. ISP 1224 in turn provides data communication services through the world wide packet data communication network now commonly referred to as the "Internet" 1225. Local network 1222 and Internet 1225 both use electrical, electromagnetic or optical signals which carry digital data streams. The signals through the various networks and the signals on network link 1221 and through communication interface 1220, which carry the digital data to and from computer 1200, are exemplary forms of carrier waves transporting the information.

Processor 1213 may reside wholly on client computer 1201 or wholly on server 1226 or processor 1213 may have its computational power distributed between computer 1201 and server 1226. Server 1226 symbolically is represented in FIG. 12 as one unit, but server 1226 can also be distributed between multiple "tiers". In one embodiment, server 1226 comprises a middle and back tier where application logic executes in the middle tier and persistent data is obtained in the back tier. In the case where processor 1213 resides wholly on server 1226, the results of the computations performed by processor 1213 are transmitted to computer 1201 via Internet 1225, Internet Service Provider (ISP) 1224, local network 1222 and communication interface 1220. In this way, computer 1201 is able to display the results of the computation to a user in the form of output.

Computer 1201 includes a video memory 1214, main memory 1215 and mass storage 1212, all coupled to bi-directional system bus 1218 along with keyboard 1210, mouse 1211 and processor 1213. As with processor 1213, in various computing environments, main memory 1215 and mass storage 1212, can reside wholly on server 1226 or computer 1201, or they may be distributed between the two. Examples of systems where processor 1213, main memory 1215, and mass storage 1212 are distributed between computer 1201 and server 1226 include the thin-client computing architecture developed by Sun Microsystems, Inc., the palm pilot computing device and other personal digital assistants, Internet ready cellular phones and other Internet computing devices, and in platform independent computing environments, such as those which utilize the Java technologies also developed by Sun Microsystems, Inc.

The mass storage 1212 may include both fixed and removable media, such as magnetic, optical or magnetic optical storage systems or any other available mass storage technology. Bus 1218 may contain, for example, thirty-two address lines for addressing video memory 1214 or main memory 1215. The system bus 1218 also includes, for example, a 32-bit data bus for transferring data between and among the components, such as processor 1213, main memory 1215, video memory 1214 and mass storage 1212. Alternatively, multiplex data/address lines may be used instead of separate data and address lines.

In one embodiment of the invention, the processor 1213 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 1215 is comprised of dynamic random access memory (DRAM). Video memory 1214 is a dual-ported video random access memory. One port of the video memory 1214 is coupled to video amplifier 1216. The video amplifier 1216 is used to drive the cathode ray tube (CRT) raster monitor 1217. Video amplifier 1216 is well known in the art and maybe implemented by any suitable apparatus. This circuitry converts pixel data stored in video memory 1214 to a raster signal suitable for use by monitor 1217. Monitor 1217 is a type of monitor suitable for displaying graphic images.

Computer 1201 can send messages and receive data, including program code, through the network(s), network link 1221, and communication interface 1220. In the Internet example, remote server computer 1226 might transmit a requested code for an application program through Internet 1225, ISP 1224, local network 1222 and communication interface 1220. The received code maybe executed by processor 1213 as it is received, and/or stored in mass storage 1212, or other non-volatile storage for later execution. In this manner, computer 1200 may obtain application code in the form of a carrier wave. Alternatively, remote server computer 1226 may execute applications using processor 1213, and utilize mass storage 1212, and/or video memory 1215. The results of the execution at server 1226 are then transmitted through Internet 1225, ISP 1224, local network 1222 and communication interface 1220. In this example, computer 1201 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention maybe implemented in any type of computer system or programming or processing environment.

Virtual Desktop System Architecture

Figure 13:
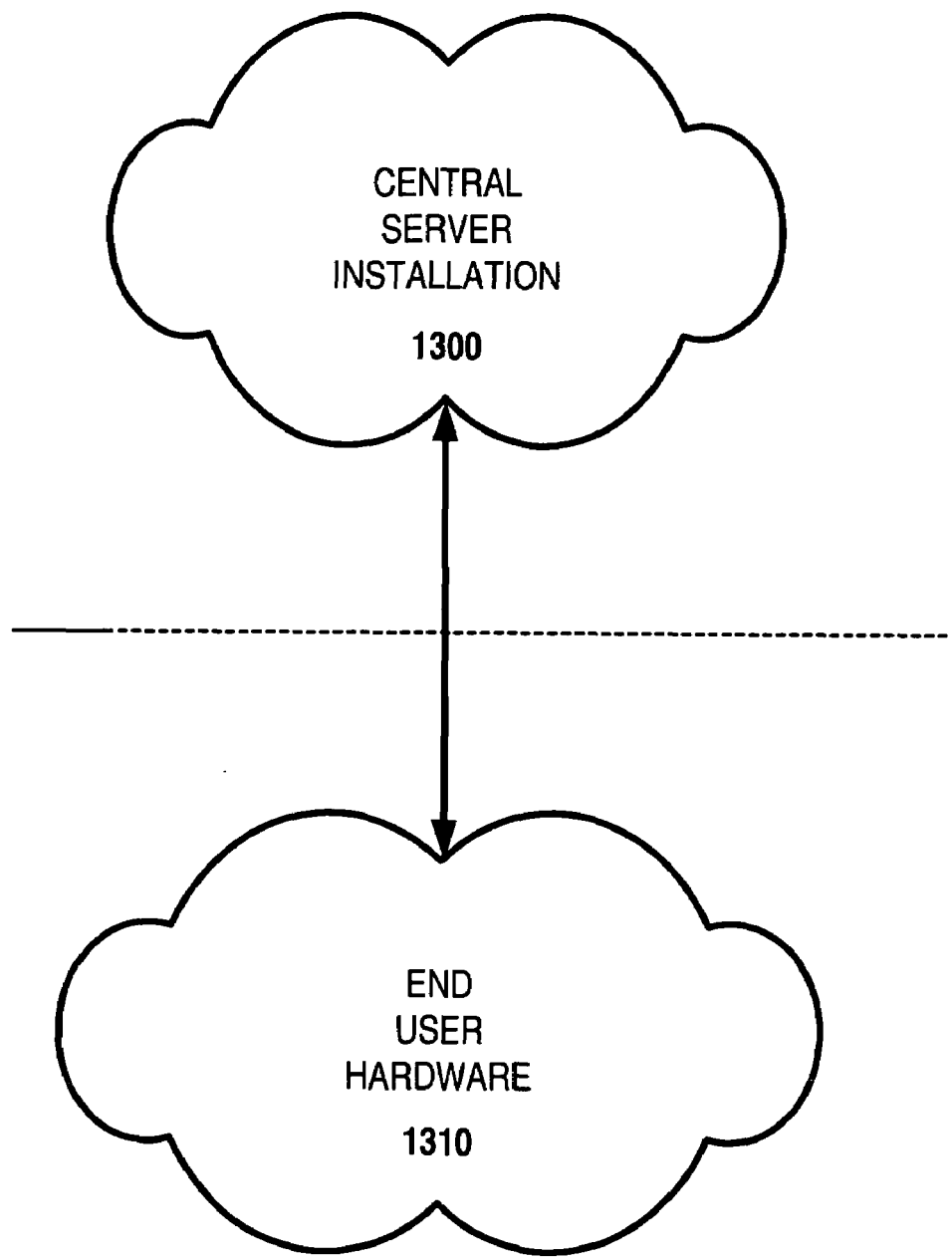
FIG. 13 shows an example of a thin client topology called a virtual desktop system architecture.

FIG. 13 shows an example of a thin client topology called a virtual desktop system architecture. The virtual desktop system architecture is one setting in which capsules are useful, but capsules are not limited to this setting. Capsules are also useful on standalone workstations, such as one that is described in connection with FIG. 12, and in a variety of other computing environments as well.

The virtual desktop system architecture provides a re-partitioning of functionality between a central server installation 1300 and end user hardware 1310. Data and computational functionality are provided by data sources via a centralized processing arrangement. At the user end, all functionality is eliminated except that which generates output to the user (e.g., display and speakers), takes input from the user (e.g., mouse and keyboard) or other peripherals that the user may interact with (e.g., scanners, cameras, removable storage, etc.). All computing is done by the central data source and the computing is done independently of the destination of the data being generated. The output of the source is provided to a terminal, referred to here as a "Human Interface Device" (HID). The HID is capable of receiving the data and displaying the data.

Figure 14:
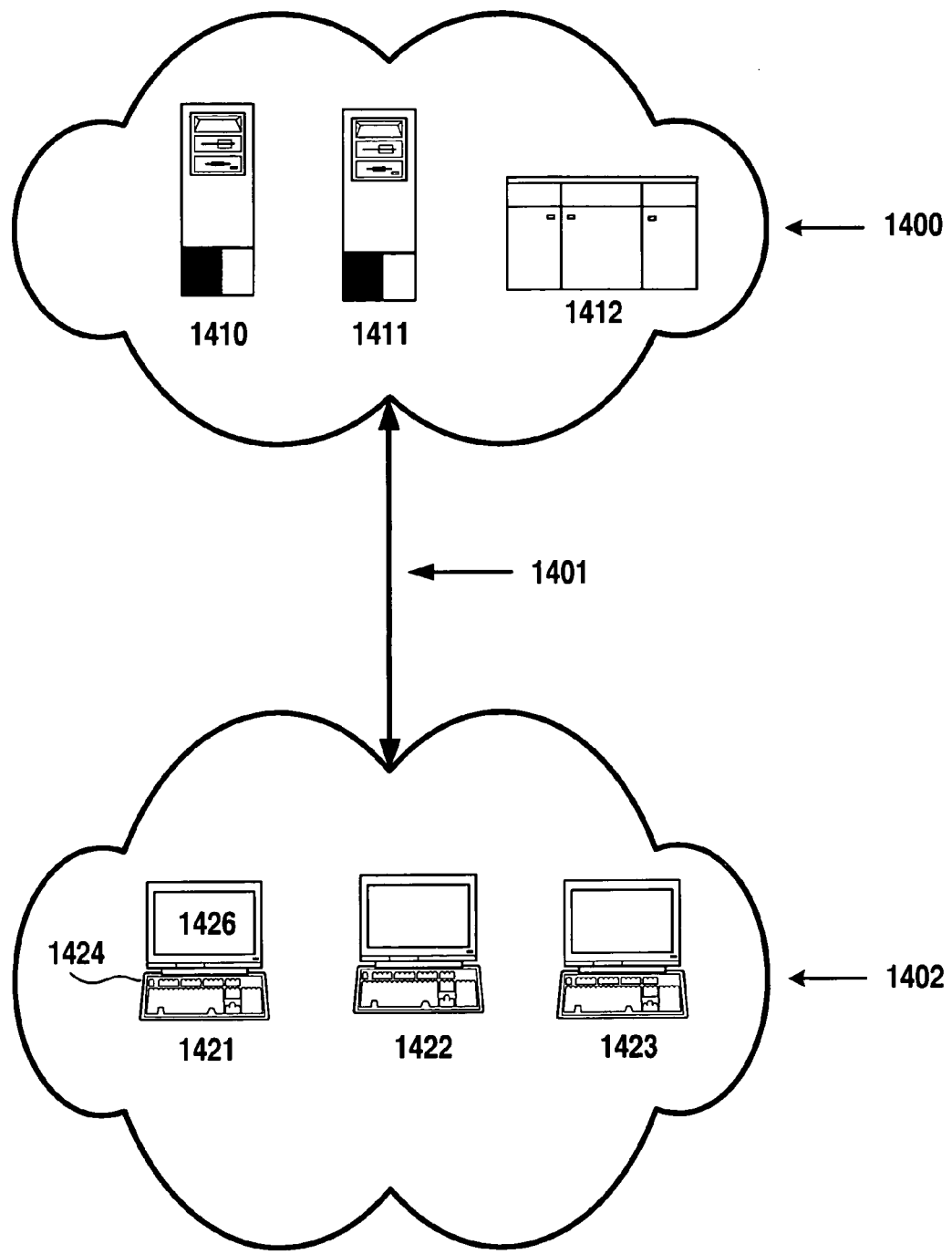
FIG. 14 displays the partitioning of the functionality of the virtual desktop system architecture.

The functionality of the virtual desktop system is partitioned between a display and input device such as a remote system and associated display device, and data sources or services such as a host system interconnected to the remote system via a communication link The display and input device is a human interface device (HID). The system is partitioned such that state and computation functions have been removed from the HID and reside on data sources or services. One or more services communicate with one or more HIDs through a communication link such as network An example of such a system is illustrated in FIG. 14, wherein the system comprises computational service providers 1400 communicating data through communication link 1401 to HIDs 1402.

The computational power and state maintenance is provided by the service providers or services. The services are not tied to a specific computer, but may be distributed over one or more traditional desktop systems such as described in connection with FIG. 9, or with traditional servers. One computer may have one or more services, or a service may be implemented by one or more computers. The service provides computation, state and data to HIDs and the service is under the control of a common authority or manager. In FIG. 14, the services are provided by computers 1410, 1411, and 1412. In addition to the services, a central data source can provide data to the HIDs from an external source such as for example the Internet or world wide web. The data source can also broadcast entities such as those that broadcast data such as television and radio signals.

Examples of services include X11/Unix services, archived or live audio or video services, Windows NT service, Java program execution service and others. A service herein is a process that provides output data and response to user requests and input. The service handles communication with an HID currently used by a user to access the service. This includes taking the output from the computational service and converting it to a standard protocol for the HID. The data protocol conversion is handled by a middleware layer, such as the X11 server, the Microsoft Windows interface, video format transcoder, the OpenGL interface, or a variant of the java.awt.graphics class within the service producer machine. The service machine handles the translation to and from a virtual desktop architecture wire protocol described further below.

Each service is provided by a computing device optimized for its performance. For example, an Enterprise class machine could be used to provide X11/Unix service, a Sun MediaCenter could be used to provider video service, a Hydra based NT machine could provide applet program execution services.

The service providing computer system can connect directly to the HIDs through the interconnect fabric. It is also possible for the service producer to be a proxy for another device providing the computational service, such as a database computer in a three-tier architecture, where the proxy computer might only generate queries and execute user interface code.

The interconnect fabric can comprise any of multiple suitable communication paths for carrying data between the services and the HIDs. In one embodiment the interconnect fabric is a local area network implemented as an Ethernet network Any other local network may also be utilized. The invention also contemplates the use of wide area networks, the Internet, the world wide web, and others. The interconnect fabric may be implemented with a physical medium such as a wire or fiber optic cable, or it may be implemented in a wireless environment.

The interconnect fabric provides actively managed, low-latency, high-bandwidth communication between the HID and the services being accessed. One embodiment contemplates a single-level, switched network, with cooperative (as opposed to competing) network traffic. Dedicated or shared communications interconnects maybe used in the present invention.

The HID is the means by which users access the computational services provided by the services. FIG. 14 illustrates HIDs 1421, 1422 and 1423. Each HID comprises a display 1426, a keyboard 1424, mouse (not shown), and audio speakers (not shown). The HID includes the electronics need to interface these devices to the interconnection fabric and to transmit to and receive data from the services.

Figure 15:
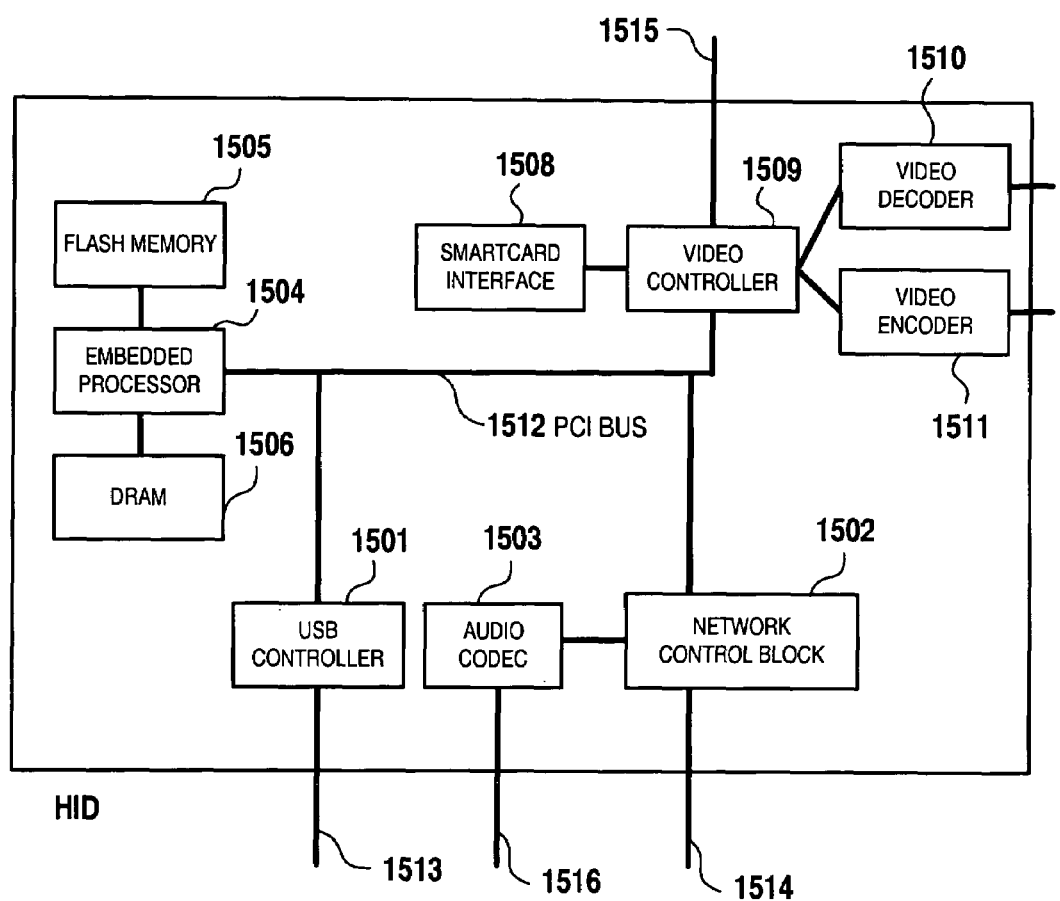
FIG. 15 is a block diagram of an example embodiment of a human interface device.

A block diagram of an example embodiment of the HID is illustrated in FIG. 15. The components of the HID are coupled internally to a PCI bus 1512. A network control block 1502 communicates to the interconnect fabric, such as an Ethernet, through line 1514. An audio codec 1503 receives audio data on interface 1516 and is coupled to block 1502. USB data communication is provided on lines 1513 to a USB controller 1501. The HID further comprises a embedded processor 1504 such as a Sparc2ep with coupled flash memory 1505 and DRAM 1506. The USB controller 1501, the network controller 1502 and the embedded processor 1504 are all coupled to the PCI bus 1512. A video controller 1509, also coupled to the PCI bus 1512, can include an ATI RagePro+frame buffer controller which provides SVGA output on the line 1515. NTSC data is provided in and out of the video controller through video decoder 1510 and encoder 1511 respectively. A smartcard interface 1508 may also be coupled to the video controller 1509.

Figure 8:
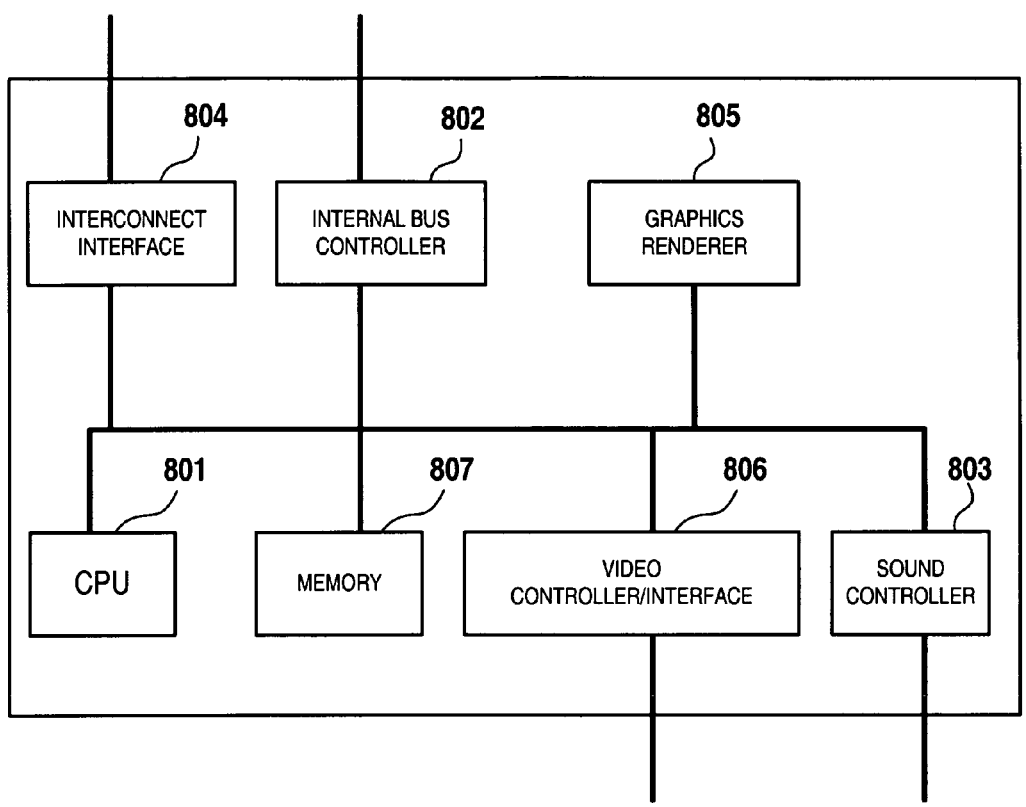
FIG. 8 is a block diagram of a single chip implementation of a human interface device.

Alternatively, the HID can comprise a single chip implementation as illustrated in FIG. 8. The single chip includes the necessary processing capability implemented via CPU 801 and graphics renderer 805. Chip memory 807 is provided, along with video controller/interface 806. A internal bus (USB) controller 802 is provided to permit communication to a mouse, keyboard and other local devices attached to the HID. A sound controller 803 and interconnect interface 804 are also provided. The video interface shares memory 807 with the CPU 801 and graphics renderer 805. The software used in this embodiment may reside locally in non-volatile memory or it can be loaded through the interconnection interface when the device is powered.

The operation of the virtual desktop system architecture is described in co-pending U.S. patent application Ser. No. 09/063,335, filed Apr. 20, 1998, entitled "Method and Apparatus for Providing A Virtual Desktop System Architecture" and assigned to the present assignee, and incorporated herein by reference.

Thus, virtual namespaces for active computing environments are described in conjunction with one or more specific embodiments. The invention is defined by the claims and their full scope of equivalents.

The invention claimed is:

1. A method for providing a virtual namespace for a compute capsule, comprising:
    mapping a shared file system into the virtual namespace to create a file system view, the file system view supplying the compute capsule with a private view of a portion of the shared file system;
    assigning a virtual token to a resource within the compute capsule, the resource being of the underlying machine and capable of being named by the compute capsule, the compute capsule being configured to provide an encapsulated form that is capable of being moved between computers without restriction, the computers being associated with different physical devices;
    interposing a name translator between the resource and the compute capsule;
    binding the resource to the virtual token with a name translation table persistently stored within the compute capsule; and
    translating the virtual token into the resource using the name translator, if the compute capsule names the resource, wherein the translating is transparent to both an operating system and any application running on the underlying machine, and
    wherein the mapping the shared file system into the virtual namespace includes mapping the shared file system into the virtual namespace based on default mappings and custom mappings.

2. The method of claim 1, wherein the name translation table provides transparent mobility of a computing environment by being mapped to new machine-local values if the compute capsule is moved to another host.

3. The method of claim 1, wherein the virtual token is only identifiable from within the compute capsule.

4. The method of claim 1, further comprising: controlling access to the compute capsule.

5. The method of claim 1, wherein the compute capsule encapsulates an active computing environment.

6. The method of claim 5, wherein the active computing environment includes one or more processes and state information that allows the compute capsule to be suspended and revived on a binary compatible machine.

7. The method of claim 1, wherein the resource is defined by one or more of a file, a processor, a memory, and an attached device.

8. The method of claim 1, wherein the compute capsule is configured to communicate with processes outside the compute capsule through Internet sockets and globally shared files.

9. The method of claim 1, wherein the compute capsule is configured to provide an encapsulated form that is independent of configuration settings of a host system.

10. A virtual namespace for a compute capsule, comprising:
    a file system view being created by mapping a shared file system into the virtual name space, the file system view supplying the compute capsule with a private view of a portion of the shared file system;
    a virtual token configured to represent a resource within the compute capsule, the resource not being shared with other compute capsules, the resource being of the underlying machine and capable of being named by the compute capsule, the compute capsule being configured to provide an encapsulated form that is capable of being moved between computers without restriction, the computers being associated with different physical devices;
    a binder configured to bind the resource to the virtual token; and
    a name translator configured to be interposed between the resource and the compute capsule, the name translator configured to translate the virtual token into the resource, if the compute capsule names the resource, wherein translation through the name translator is transparent to both an operating system and any application running on the underlying machine, and
    wherein the mapping the shared file system into the virtual namespace includes mapping the shared file system into the virtual namespace based on default mappings and custom mappings.

11. The virtual namespace of claim 10, wherein the binder provides transparent mobility of a computing environment by being mapped to new machine-local values if the compute capsule is moved to another host.

12. The virtual namespace of claim 11, wherein the binder is a name translation table.

13. The virtual namespace of claim 10, wherein the virtual token is only identifiable from within the compute capsule.

14. The virtual namespace of claim 10, further comprising:
    an access control list for controlling access to the compute capsule.

15. A computer-readable storage media for directing a computer to create a virtual namespace for a compute capsule, the computer-readable storage media comprising:
    instructions for creating a file system view in the virtual namespace by mapping a shared file system into the virtual name space, wherein the file system view provides the compute capsule with a private view of a portion of the shared file system;

instructions for assigning a virtual token to a resource within the compute capsule, the resource being of the underlying machine and capable of being named by the compute capsule, the compute capsule being configured to provide an encapsulated form that is capable of being moved between computers without restriction, the computers associated with different physical devices;

instructions for interposing a name translator between the resource and the compute capsule;

instructions for binding the resource to the virtual token with a name translation table persistently stored within the compute capsule; and instructions for translating the virtual token into the resource using the name translator, if the compute capsule names the resource, wherein translation is transparent to both an operating system and any application running on the underlying machine, and wherein the mapping the shared file system into the virtual namespace includes mapping the shared file system into the virtual namespace based on default mappings and custom mappings.

16. The computer-readable storage media of claim 15, wherein the name translation table provides transparent mobility of a computing environment by being mapped to new machine-local values if the compute capsule is moved to another host.

17. The computer-readable storage media of claim 15, wherein the virtual token is only identifiable from within the compute capsule.

18. The computer-readable storage media of claim 15, further comprising:

instructions for controlling access to the compute capsule.

* * * * *